Oct. 14, 1941.  E. A. RING  2,259,081
NOSE PAD OR GUARD FOR EYEGLASSES, SPECTACLES, AND THE LIKE
Filed Feb. 13, 1940
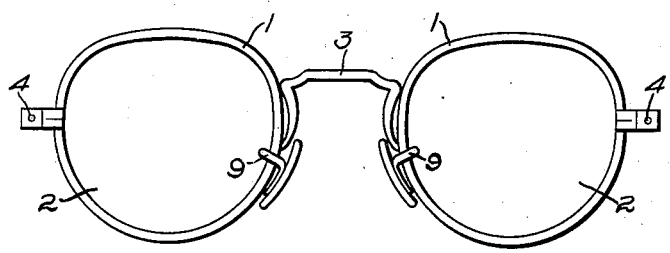
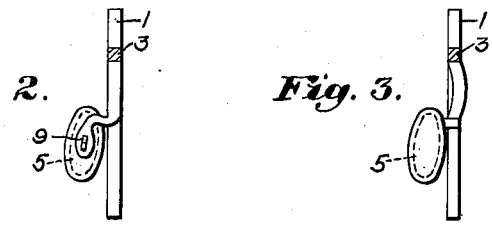
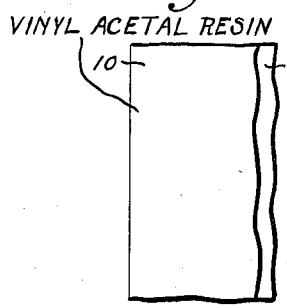  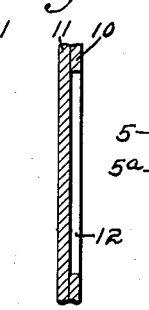 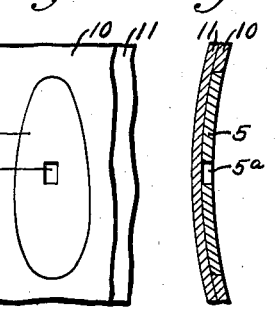
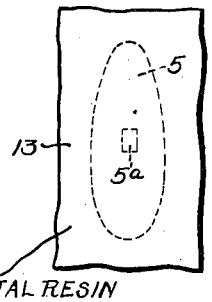 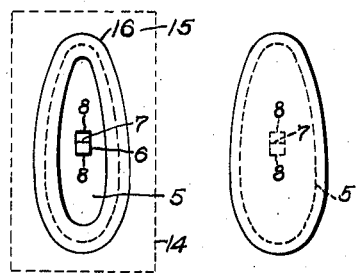
Inventor:
Ernest A. Ring,
by Emery, Booth, Townsend, Miller and Laidlaw
Attys.

Patented Oct. 14, 1941

2,259,081

UNITED STATES PATENT OFFICE 2,259,081

NOSE PAD OR GUARD FOR EYEGLASSES, SPECTACLES, AND THE LIKE

Ernest A. Ring, Providence, R. I., assignor of one-half to Francis M. Blakeney, East Providence, R. I.

Application February 13, 1940, Serial No. 318,700

4 Claims. (Cl. 88—48)

This invention relates to nose pads or guards for eyeglasses, spectacles and the like, and also to the resulting optical articles.

This application is a continuation as to common subject-matter of my co-pending application Ser. No. 190,369, filed February 14, 1938, now Patent No. 2,216,503, dated October 1, 1940, for nose pads for eyeglasses and spectacles. The disclosure in this application is specifically different from but involves the same general subject-matter that is disclosed in my co-pending application Ser. No. 317,709, filed February 7, 1940.

In order that the principle of the invention may be readily understood, I have in the accompanying drawing disclosed a single embodiment of the structure of my invention, and I shall describe how my invention may best be practised.

In the said drawing,

Fig. 1 is a rear elevation of a pair of eyeglasses or spectacles constructed in accordance with my invention or having my invention applied thereto;

Figs. 2 and 3 are respectively rear and front elevations of the nose pad or guard and an adjacent portion of the frame from which it is supported;

Fig. 4 represents in plan the two sheets or the folded sheet of the plastic composition here briefly and generally referred to as a resinous product resulting from the polymerization of certain vinyl compounds;

Fig. 5 is a plan view similar to Fig. 4, but representing one of the sheets or laminations as having a hole died or stamped out for the reception of the basal member;

Fig. 6 is a vertical section taken through Fig. 5;

Fig. 7 is a view similar to Fig. 5 but representing the basal member positioned in the opening in the upper sheet or lamination;

Fig. 8 is a vertical section of the structure shown in Fig. 7, but representing also the concaving or bending both of the basal member and the applied plastic substance into the final shape thereof;

Fig. 9 is a plan view representing the topmost sheet of the plastic material that is to be applied over the incomplete structure shown in Figs. 7 and 8;

Fig. 10 is a vertical section of the still incomplete structure after the sheet shown in Fig. 9 has been applied and showing also the post secured to the basal member;

Fig. 11 is a plan view representing by the dotted rectangle the plastic material before the surplus portion thereof has been removed from the otherwise nearly completed article; and Fig. 12 is a top plan view of the completed nose pad or guard, ready for attachment to the spectacle or eyeglass frame.

It has long been sought to provide suitable nose pads or guards for spectacles, eyeglasses and the like, but so far as I am aware no entirely satisfactory substance has heretofore been found or used for this purpose. The prior art discloses the use of many different substances such as metal, shell or bone, and such substances in many cases have been covered with some material, such as soft rubber. The contact of rubber directly with the skin of the wearer has long been known to be objectionable, and various other materials have been tried, either to overlay the rubber and thus to prevent direct contact thereof with the nose of the wearer, or as substitutes for the metal, shell, bone or other substance constituting the basal member of the nose pad or guard.

There has been a long standing problem in eyeglass wear, the proper solution of which has never heretofore been arrived at so far as I am aware. The problem in question includes that of resting or supporting a pair of eyeglasses on the sides of the nose in such manner and with the use of such material as to allow the wearer maximum comfort and efficiency, and yet at the same time preventing the direct contact with the skin of the wearer of any substance that may injuriously affect the skin.

Not only has it been established that the direct contact with the skin of the wearer of rubber in any form as a nose pad or guard is deleterious, but nose pads or guards employing rubber as the surface to come in direct contact with the skin of the wearer are comparatively expensive over a period of time.

Where rubber has been so used, it has been customary from time to time to remove the rubber material and to substitute a fresh rubber piece therefor. This, however, involves a substantial expense if the user wishes to secure efficiency in use and the best appearance of the device.

Moreover, with such substances as have heretofore been employed as the skin-contacting substance, the nose pad or guard soon becomes dirty on the outer surface, and this increases the hazard of infection. Physicians are practically agreed that continued direct contact with rubber is unhealthy for tender skin. Moreover, a period of wear of such a device having a skin-contacting rubber surface for a few months, results in the rubber portion of the pad or guard becoming swollen. In many instances the rubber member completely disintegrates before the supposed time limit of wear is reached. Furthermore, many such articles are unsightly from the very commencement of this use, and they continue to become more and more unsightly the longer they are used.

Owing to the objections in one way or another to all substances heretofore used or the use of which I have experimented with and tested, I have conducted painstaking investigations to obtain a wholly satisfactory substance, with the result that with a certain material hereinafter more definitely described, I have developed or discovered unexpected qualities or capacities of the material and have found that by using such material as herein disclosed, I have provided a nose pad or guard which constitutes its own cushion and does not need an underlying cushioning material of rubber or anything else. In other words, the material is self-cushioning. The material also responds to the body heat or temperature of the skin of the wearer in that it adapts itself to the shape of the part of the nose with which it comes in contact. I have also discovered that the action of the oils or exudations of the skin of the wearer of the eyeglasses or spectacles, makes the material more pliable and removes a certain stickiness natural to the substance employed, and which stickiness, when removed in the manner stated, does not return to the substance.

The foregoing and other qualities which I have ascertained as unexpected advantages and unexpected features of adaptability of the substance, render the same what I believe to be a nose pad or guard, or skin-contacting portion thereof, for which I and other manufacturers of eyeglasses and spectacles have long sought, and heretofore in vain.

The substance found to be wholly satisfactory as employed by me may be briefly described as a resinous product resulting from the polymerization of certain vinyl compounds. More precisely stated, I employ a plastic composition obtainable by polymerizing compounds containing the vinyl ($CH_2:CH$) or substituted vinyl radicals and defined generally as polyvinyl resins; for example, polyvinyl halides, a copolymer obtained from vinyl acetate and vinyl chloride, the polyvinyl esters, and vinylidene halide polymers, the polyvinyl acetate, the polyacrylates, polymethacrylates, copolymers of vinyl chloride and acrylates, and polystyrene.

I have obtained the best results in the manufacture of nose pads or nose guards with polyvinyl acetal resins. These vary in the proportion of the degree of hydrolysis of the ester and the degree of combination of the aldehyde. I obtain a very highly satisfactory polyvinyl acetal resin by hydrolyzing a polyvinyl acetate and reacting with formaldehyde so that the final resin is made substantially of 82% acetal, 8% hydroxyl groups, calculated as polyvinyl alcohol, and 10% acetate by weight. Another very highly satisfactory plastic compound of a polyvinyl resinous nature is produced by hydrolyzing a polyvinyl acetate and reacting with butyraldehyde, so that the final resinous substance may be considered to be made of substantially 2% or less of acetate, 16 to 20% hydroxyl groups calculated as polyvinyl alcohol and the balance acetal. Both of the foregoing substances I suitably plasticize, in order to adapt them to my purpose, as will be set forth hereinafter.

I may also employ polyvinyl acetals made with other aldehydes, as, for example, acetaldehyde propionaldehyde, valeraldehyde and the like, or mixtures of aldehydes may be used. More briefly stated, I employ a vinyl resin and more especially the vinyl acetals of the so-called "Butvar" type.

A vinyl resin of the Butvar type may be briefly defined as a partial polyvinyl acetal employing butyraldehyde as the acetalization medium. Other polyvinyl acetals may vary in the extent of hydroxyl groups, the residual ester groups and the acetal groups present in the vinyl composition.

As herein fully set forth, the polyvinyl acetal resinous coating material employed by me and which is directly applied as a self-cushioning plastic material to the basal element, is, because of its herein defined composition, inherently responsive to the body heat at the place of use and is strongly resistant to any deterioration therefrom, and it inherently adapts itself to and retains the shape of the nose at the area of the place of use thereof, and because of its defined composition it is non-sticky in use. Other advantages thereof are herein set forth.

Having referred in detail to certain plastic substances which I have found to possess unexpected qualities peculiarly adapting them to use as a nose guard or pad that comes in direct contact with the skin, I shall proceed to describe the preferred embodiment of my invention without, however, limiting my invention to the things herein described.

In Fig. 1, I have represented a pair of eyeglasses or spectacles, the frame whereof is shown at 1, and the glass elements at 2. The nose piece is indicated at 3. These parts may be of any usual or preferred construction. The nose piece 3 is formed with or suitably attached to the frame 1, and suitable temples may be attached, in the case of spectacles, at the parts 4. The nose piece 3 is provided with two guards or pad portions to engage the opposite sides of the nose of the wearer.

While the basal portion of such pads or guards may be constructed in any suitable manner, I preferably provide a basal member 5 of suitable shape, which is of metal. It may be of nickel, silver, gold, platinum, white gold, or almost any semi-precious or precious metal. It has preferably applied thereto in the central hole 5a at a suitable stage in the process of manufacture, or has formed integral therewith a rivet-like protruding part or post 6, best shown in Fig. 10. Said rivet-like part or post 6 is desirably slitted as indicated at 7 to provide two supports or prongs 8. The somewhat enlarged part 9 of the guard, as shown in Fig. 2, is provided with a hole through which the rivet-like part or post 6 passes, after which the prongs 8 are bent or forced outwardly so as to lie flatwise against the surface of the part 9, thereby firmly securing the basal member 5 of the nose guard or nose pad to the frame. In this or any other suitable manner, the basal portion of the nose pad or guard is attached. It is immaterial, so far as my invention is concerned, how the basal member 5 is attached to the frame 1.

In my co-pending application Ser. No. 317,709, I have disclosed certain processes of constructing a nose pad or guard for spectacles and eyeglasses by applying vinyl acetal resin to both faces of a basal member. According to one process therein disclosed, a plurality of sheets or laminations, such as three, are provided with aligned holes to receive the post of the basal member, said sheets or laminations being then applied to the face of the basal member wherefrom the post extends, and thereafter another plurality of sheets or laminations are applied to the other face of the basal member.

In the present application, I disclose a specifically different nose pad or guard having, however, the advantages incident to the construction disclosed in my said application Ser. No. 317,709.

I will now describe my present invention, making specific reference to Figs. 4 to 12 inclusive, wherein the several steps involved in my present invention are illustrated.

In order to prepare or construct the nose pad or guard according to the steps indicated in Figs. 4 to 12, I place two sheets or laminations of the described vinyl acetal resin, or a single folded sheet or lamination thereof, in a suitable receptacle. The said sheets or the folds of the single sheet are indicated at 10, 11 in the several figures, the lowermost sheet or fold 11 being represented as extending beyond the upper sheet or fold, merely to indicate the presence of two thicknesses of the described resinous material. At a suitable stage in the process or operation, the said resinous material is soaked in a suitable solvent, which is not one containing alcohol, as upon tests made by me an alcohol solvent has been found to be unsatisfactory for my purpose. The solvent employed by me softens the resinous material sufficiently to make a bond, but it must be and is of such a character as not to deteriorate the resinous material which is at a suitable time in the process or operation thoroughly soaked in solvent.

I stamp or die out in the sheet or lamination 10 a hole 12 which is of the exact size and contour of the basal member 5. Preferably this dieing or cutting out is effected before the sheets or laminations 10, 11 are soaked in the solvent, but the order of the steps may be varied as found suitable, and, if desired, the hole 12 may be formed before the sheets or folds 10, 11 are superimposed. In either event the two sheets or laminations 10, 11 are at some stage in the process or operation in a superimposed condition with the hole 12 in the sheet 10. With the sheets or laminations in that condition and position, the basal member 5 is placed in the opening 12 as indicated in Fig. 7. At this stage of the process or operation the basal member 5 may be without the post 6, if the latter is a separate entity, and I have in Figs. 7 and 8 represented the hole 5a that is to receive the said post 6. The basal member 5 is, as shown, of the same thickness as the sheet or lamination 10. Preferably at this stage of the process or operation, or it may be at a later stage, the basal member 5 with the two sheets or laminations 10, 11 are bent or curved into the concave shape shown in Fig. 8.

I then, as shown in Fig. 9, apply to the exposed face of the basal member 5 and to the adjacent face of the sheet or lamination 10, another sheet or lamination 13 of the same material,—that is, a vinyl acetal resin of the character hereinbefore described.

I then cause the sheet or lamination 13 to become further bonded with the sheets or laminations 10, 11, which at this stage of the process or operation or at an earlier stage have themselves been bonded together, this being done while the resinous material is in a plastic condition, having been rendered plastic by the employment of the suitable solvent referred to by me. The bonding is effected in a press where a suitable pressure is applied, with heat if desired, and with the use of additional solvent material during the application of pressure. It is to be understood that the solvent employed by me renders the resinous material satisfactorily plastic throughout the process or operation, and that the several sheets or laminations 10, 11, 13 become bonded together, heat and pressure being preferably employed in effecting the bonding.

In Fig. 10, I have represented the post 6 as secured in the hole 5a of the basal member 5, and it is to be understood that if said post 6 is not integral with the basal member, it may be secured thereto at any suitable stage in the process or operation, as, for example, prior to the stage indicated in Fig. 7.

After the nose pad or guard structure has been completed so far as shown in Fig. 10, I then remove by suitable cutting, dieing out or other operation all the said resinous material within the dotted rectangle 14, as indicated at 15, up to the perimeter 16 of the completed nose pad or nose guard, excepting that after the removal of the excess portion 15, represented in Fig. 11, each pad is subjected to suitable treatment to remove the rough edge of the perimeter 16. This may be done by subjecting each pad, after the removal of the excess material 15, to the action of a suitable sand belt or the like. Preferably thereupon each pad is then transferred to a rubbing wheel so as to impart the desired smoothness. Preferably the nose pad or guard is then dipped into a solvent such as Monsanto No. 45 Dip, which is a mixture of one or more ketones and one or more esters, thereby obtaining a very clear brilliant finish and transparency.

Desirably before applying the basal member 5 to the resinous material, I treat the said member 5 with a suitable liquid material to remove finger prints and to aid in the binding of the resinous material to the said metal basal member 5. Such liquid material may also be what is known as Monsanto No. 45 Dip, above identified.

I am, of course, aware that vinyl resins have been employed in certain wholly unrelated processes, but I believe I am the first to employ such material in such way, or to adapt it to such use that the said resinous material contacts in use with the skin when the article to which it is applied is in its intended use. Being the first, so far as I am aware, to make such use thereof, I have in making said use ascertained that the resinous material has unexpected qualities adapting it to the said use as a skin-contacting substance. Among the said unexpected qualities which I have discovered or developed are (1) the substance is self-cushioning and does not need any cushioning member thereunder, such as rubber, (2) the said resinous material, referred to briefly as a vinyl acetal resin, by reason of coming into contact with the skin of the user of the eyeglasses or spectacles, is in such case rendered more pliable, and thus in use actually comes to conform to the shape or contour of the nose at the area of contact of the pads with the nose, and (3) the oils or exudations of the skin are found to remove permanently the stickiness present in the resinous material.

I have discovered that not only does the solvent employed by me render the resinous material, or resinous material composition, suitably plastic so that it makes a bond of the several laminations of the resinous material, but that in its said plastic condition it suitably adheres to the metal basal member, particularly when the same has been given a suitable liquid dip to aid in the binding of the resinous material thereto, and even more important, the solvent, in the presence of heat and pressure, thoroughly clears up the resinous material and makes it transparent.

I have discovered that the said resinous material is, in the herein described stages of manufacturing the nose pad or guard, readily absorbent, so that it will retain color dyes that I apply thereto. Therefore, I may and do dye the nose pad or guard any desired color, or I may change the color which it may have had as the result of the steps of its manufacture into vinyl acetate resin.

Many of the substances heretofore used for the skin-contacting portion of nose pads or nose guards are brittle or became so in use, but I have discovered that this is not the case with the material employed by me, and here referred to briefly as vinyl acetate resin. The said material has been proved by me to have the quality of permanence as a nose pad or guard, although it is soft and pliable and is self-cushioning, a most highly desirable quality.

It is to be understood that the resinous materials employed by me vary, depending among other things upon the polyvinyl ester used, the extent of the hydrolysis reaction and the nature and amount of the aldehyde combined.

Vinyl resins suitable for use in my invention may be formed from vinyl esters by known polymerization processes, and the substance employed by me is a vinyl resin or vinyl resin composition.

In my said co-pending application Ser. No. 317,709, I have disclosed other species than that herein disclosed and claimed, and I have in said co-pending application more generically claimed the invention common to both applications. The invention herein claimed provides for the application of a single complete sheet or lamination at the outer surface of the basal member, another sheet or lamination at the inner face thereof having more or less of its central portion removed to permit the securing of the enlarged part 9 of the guard, and what is in the completed article an elliptical or ring-like marginal sheet or lamination 10 positioned only around the perimeter of the basal member, so as to lie between the two sheets or laminations 11 and 13, of which the sheet 11 wholly covers the face of the basal member 5 that is next the nose, the sheet 13 having preferably only so much of the central portion thereof removed as permits the part 9 to be secured flatwise against the other face of the basal member 5. By proceeding in this manner I provide a well defined marginal piece 10 that, in the completed nose guard or pad, is blended or bonded with the described sheets or laminations 11 and 13.

Having thus described one embodiment of the structure of my invention and the steps employed by me in constructing the article of my invention, it is to be understood that although specific terms are employed, they are used in a generic and descriptive sense and not for purposes of limitation, the scope of the invention being set forth in the following claims.

I claim:

1. In eyeglasses, spectacles and like optical articles having a frame including a nose piece, a nose pad or guard having a basal element secured to the nose piece, and having permanently and tightly adherent thereto a laminated covering composition of polyvinyl acetal resin very markedly self-cushioning in comparison with commercial zylonite and Celluloid, and, because of its said composition, being devoid of the generally recognized objections to rubber as a skin-contacting substance, the said covering composition as applied to the said basal element consisting of a series of laminations of polyvinyl acetal resin, all finally completely bonded together while plastic under pressure, the laminations of the said series including two laminations at the opposite faces respectively of said basal element and another lamination encircling the perimeter of said basal element between said two laminations, the said covering being, because of its said composition, inherently responsive to the body heat of the area of skin-contact with the nose of the wearer, so as substantially to self-mold or self-cushion itself to the nose contour or nose conformation of the wearer, and also being strongly resistant to deterioration from such contact with the skin of the wearer, and being non-sticky in use.

2. A nose pad or guard for eyeglasses, spectacles and like optical articles according to claim 1, but in which the said covering composition is obtained by hydrolyzing a polyvinyl acetate and re-acting with formaldehyde.

3. A nose pad or guard for eyeglasses, spectacles and like optical articles according to claim 1, but in which the said covering composition results from the polymerization of vinyl compounds.

4. A nose pad or guard for eyeglasses, spectacles and like optical articles according to claim 1, but in which the said covering composition consists of a partial polyvinyl acetal employing butyraldehyde as the acetalization medium.

ERNEST A. RING.